May 21, 1940.    W. E. WHITED    2,201,359
BURIAL VAULT MOLD
Filed Nov. 8, 1938    2 Sheets-Sheet 2
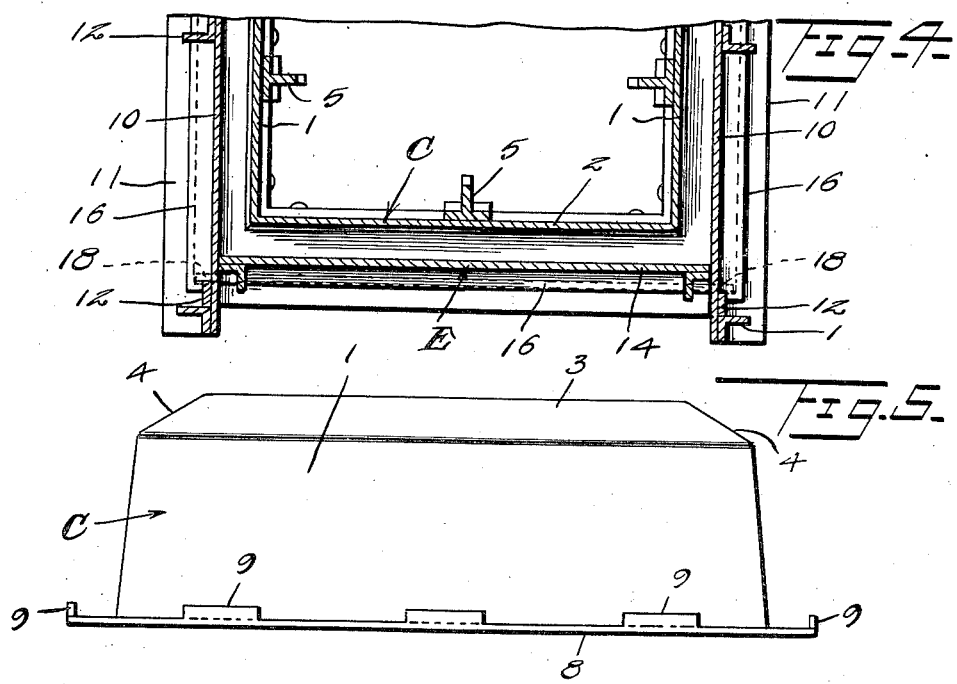
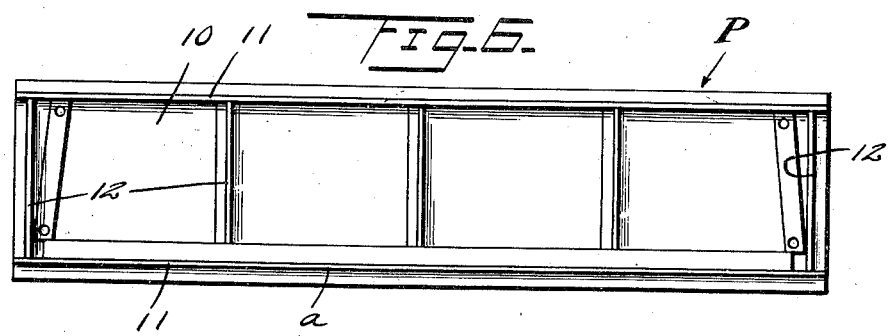
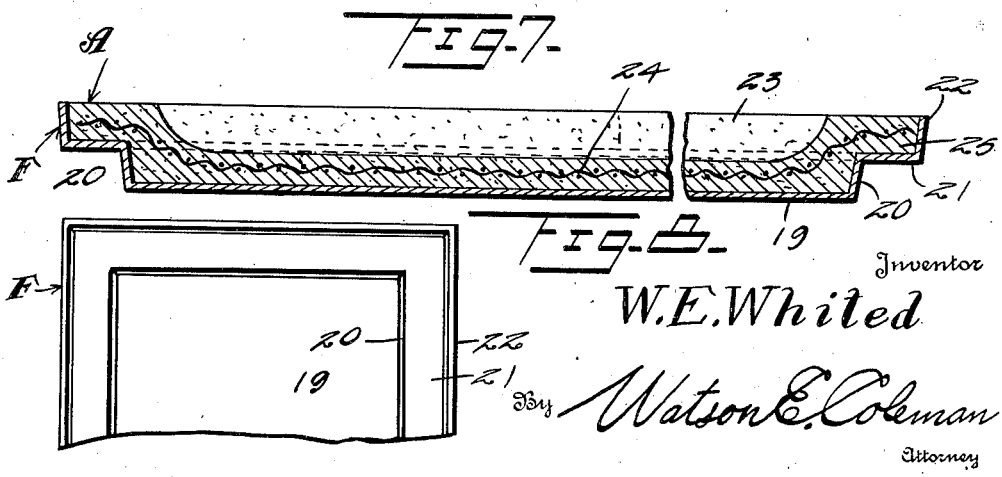
Inventor
W. E. Whited
By Watson E. Coleman
Attorney Patented May 21, 1940

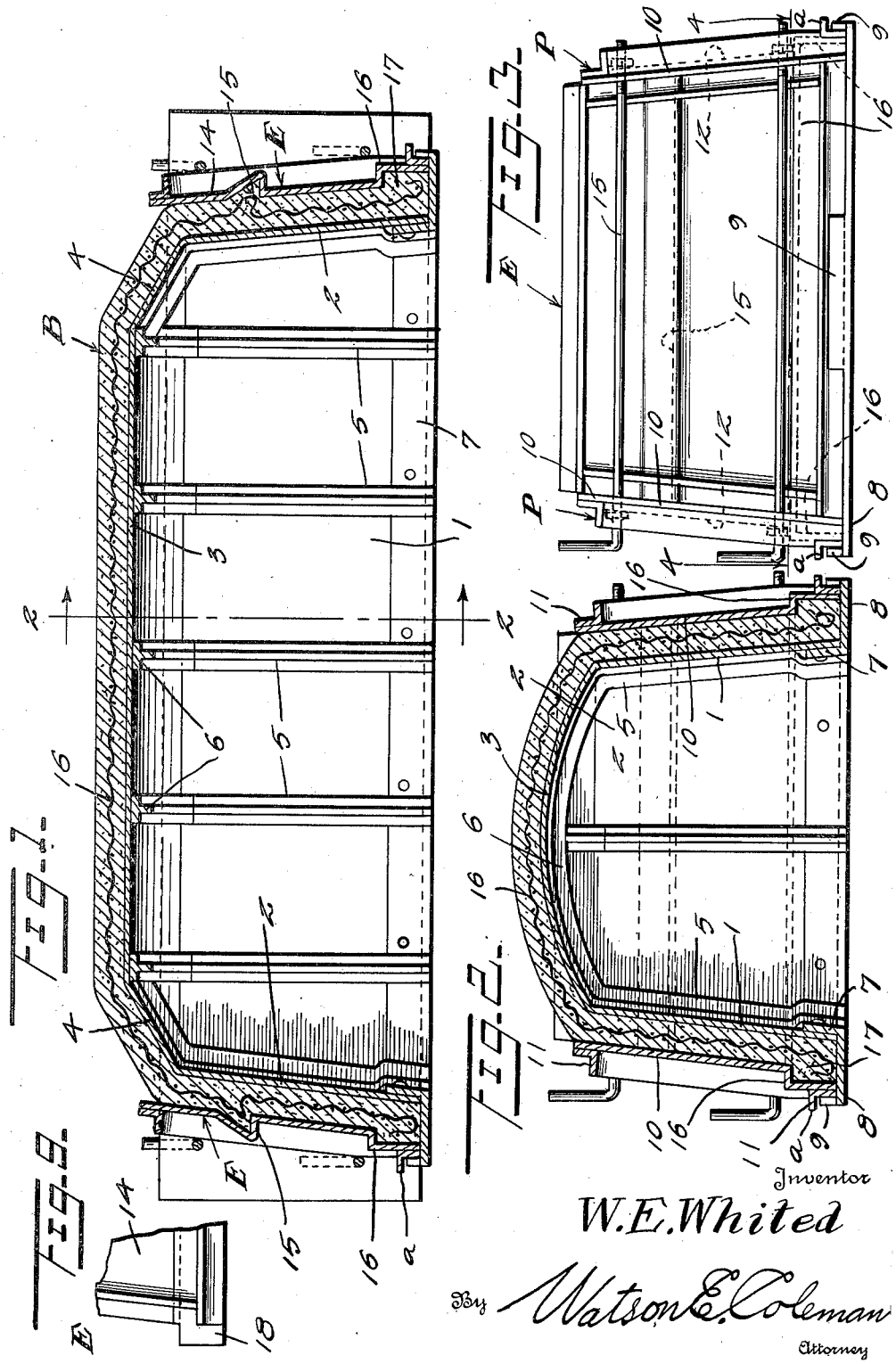

2,201,359

UNITED STATES PATENT OFFICE 2,201,359

BURIAL VAULT MOLD

William E. Whited, Escondido, Calif.

Application November 8, 1938, Serial No. 239,540

2 Claims. (Cl. 25—130)

This invention relates to a mold and has relation more particularly to a mold for making burial vaults, and it is a particular object of the invention to provide a mold of this kind which comprises a small number of parts which can be readily assembled to form a vault or disassembled after the molding has been completed.

The invention also has for an object to provide a mold of this kind wherein the various parts are effectively strengthened to increase the practicability of the mold and wherein the core for producing the body portion of the vault constitutes a single unit having a strong and rigid foundation.

Furthermore, it is an object of the invention to provide a mold of this kind including a single or one piece form for molding the base of the vault.

The invention consists in the details of construction and in the combination and arrangement of the several parts of my improved mold whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a longitudinal vertical sectional view taken through the portion of the mold assembled for making the body of the vault, the molded product being also shown in section;

Figure 2 is a transverse sectional view taken substantially on the line 2—2 of Figure 1 looking in the direction of the arrow;

Figure 3 is a view in end elevation of the assembly illustrated in Figures 1 and 2;

Figure 4 is a fragmentary horizontal section taken substantially on the line 4—4 of Figure 3, the molded vault body being omitted;

Figure 5 is a view in side elevation of the core used in molding the body of the vault;

Figure 6 is an outside elevational view of one of the outside form panels as herein comprised;

Figure 7 is a longitudinal sectional view taken through the base form as herein disclosed with the molded vault base therein;

Figure 8 is a view in top plan of the end portion of the form illustrated in Figure 7 with the base omitted;

Figure 9 is a fragmentary elevational view of the lower corner portion of an end panel.

As disclosed in the accompany drawings, C denotes a core member to be used in the molding of the body of the vault. This core member, as herein disclosed, is hollow and comprises the side plates or walls 1 and the end plates or walls 2 upwardly disposed on desired inward angles and which have associated therewith the top plate or wall 3, the major portion of which is preferably rounded in cross section with the end portions of the top wall 3 disposed on suitable downward outward bevels, as at 4.

The walls or plates 1, 2 and 3 of the core member C are preferably made of sheet metal of requisite gauge and these walls are effectively maintained in rigid assembled relation by the inner bracing and reinforcing members 5 preferably angle irons, and which are welded or otherwise securely anchored to the walls or plates 1, 2 and 3.

The irons 5 associated with the side plates or walls 1, as herein disclosed, constitute the side members of a yoke substantially in the form of an inverted "U" with the intermediate portion 6 thereof having direct coaction with the top wall or plate 3.

Suitably secured to the lower marginal portions of the plates or walls 1 and 2 and extending entirely therealong are the angle members 7. These members 7 are preferably of metal and are of considerable weight whereby a firm foundation is provided for the core member C. These angle members 7 include the outstanding horizontal flanges 8 which extend outwardly from the walls or plates 1 and 2, and the outer marginal portions of these flanges 8 are provided with one or more upstanding lugs 9 each preferably of a material length. These lugs 9 serve to provide effective holding or retaining means for the outside panels.

The outside form panels P, as herein disclosed, each comprises a plate 10 of sheet metal of requisite gauge and of required dimensions and welded or otherwise securely anchored to the outer face of the plate 10 along the longitudinal marginal portions thereof are the strengthening or reinforcing angle bars 11. At desired points intermediate its ends the outer face of the plate 10 has suitably secured thereto the spaced reinforcing members or irons 12 which substantially bridge the space between the applied reinforcing members or irons 11. It is to be noted that the horizontal flange $a$ of the lower reinforcing member or iron 11 is along the upper portion of said member or iron so that it will be free of contact with the lugs 9 when the panel P is being placed in working position.

Each of the end panels E is constructed in substantially the same manner as a side panel except that the upper portion of the plate 14 of each end panel is formed to provide therealong a pocket or recess 15 of such cross sectional configuration to result in the molded product being provided across its end wall with an outstanding ledge or shoulder. In connection with a burial vault such a ledge or shoulder at each end thereof is of importance to assure proper engagement with the vault of the hoisting rigging for placing the vault in proper position.

As clearly shown in the accompanying drawings, the side panels P when in position have their lower marginal portions resting upon the flanges 8 along the sides of the core member C and contacting from within with the lugs 9.

The end panels E are of a length equal to the desired maximum width of the vault body to be molded and each of these panels is placed upon an end flange 8 between the applied side panels P and in contact from within with the holding lugs 9 on the end flanges. The side panels P are of such length as to extend outwardly beyond the end panels E when said panels E and P are in assembly, and the applied panels E and P are effectively held in assembled position by the conventional type of holding bolts directly associated with the side panels P and which are located outwardly of but immediately adjacent to the end panels E. It is also to be noted that the panels P and E are of a height when in assembly to have their upper marginal portions terminate below the high point of the top wall or plate 3 to facilitate the proper forming of the top wall of the vault body. In making the vault body B the outer faces of the plates or walls 1, 2 and 3 together with the inner faces of the plates 10 and 14 of the panels P and E are oiled, after which the panels P and E are placed in proper assembly around the core member C.

Cementitious material of a flowing consistency is then poured between the core member C and the applied panels P and E until the assembled form is substantially filled. A cementitious mixture of about the consistency of plaster is then placed on the top wall or plate 3 of the core member C and properly smoothed out and formed by a trowel. After the material has properly set the bolts are properly released whereupon the panels P and E can be readily removed.

After the panels P and E have been removed, the core member C with the vault body B molded or formed thereon is lifted, preferably by a hoist, two or three inches. While so suspended the outer marginal exposed portions of the flanges 8 at the base of the core member C are tapped with a suitable implement whereupon the core member C of its own weight will drop down. The molded body B is then further raised up sufficient to permit the core member C to be slid out from below such raised body to a new position. However, if the molded or formed body B should be raised by a travelling hoist, the body B can be carried away by such hoist without the necessity of shifting the core member.

It is to be stated that in the forming of the body B suitable reinforcement 16 will be placed for proper embedding within the wall of the body.

In order to give additional strength to the lower marginal portions of the molded body B and also to add esthetic value to the vault, the lower marginal portions of the plates 10 and 14 are outwardly offset, as at 16, which results in the formation of an outstanding surrounding flange 17 at the bottom or base portion of the vault body B.

As is illustrated in Figure 9, each lower corner of an end panel E is provided with an outstanding extension plate 18 which extends within the offset portion 16 at the adjacent end of a side panel P.

The burial vault in addition to the body B also includes a base member A upon which the body B rests after the casket has been properly positioned upon the base member A. In Figure 7 of the drawings a cross sectional illustration of the base member A is shown in inverted position. The form F for producing the base member A, as herein disclosed, constitutes a single unit and, as is illustrated in Figures 7 and 8, the form or unit F comprises a bottom plate 19 of desired dimensions having its marginal portions defined by the upstanding walls or flanges 20 of required height. The upper marginal portions of the flanges or walls 20 are defined by the outstanding flanges 21, the outer margins of which are defined by the upstanding flanges 22.

Cementitious material of proper consistency is poured within the form or unit F. After the pouring of this cementitious material a considerable amount of such material is removed, as indicated at 23, to lighten the weight of the molded base. It is to be noted that the walls 20 and 22 are outwardly flared to facilitate the separation of the form or unit F from the molded base.

It is believed to be apparent that when the base member A is used it comprises an upper central or major portion 24 upon which the casket is placed together with the outstanding ledges 25 upon which are rested the lower free wall edge faces of the body B.

From the foregoing description it is thought to be obvious that a mold constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A burial vault mold including a hollow unit core member for the body portion of the vault, said member comprising side, end and top walls, reinforcing members each in the form of substantially an inverted U within the core member and secured to the side and top walls thereof, elongated angle members of considerable weight secured to and extending along the lower marginal portions of the side and end walls of the core member, said angle members having flanges extending outwardly beyond the side and end walls, removable side and end panels for placement upon the outstanding flanges of the angle members in spaced relation with respect to the side and end walls of the core member, means for holding the panels in assembly, and upstanding lugs carried by the outer marginal portions of the flanges of the angle members with which the lower marginal portions of the panels contact from within.

2. A burial vault mold including a hollow unit core member for the body portion of the vault, said member comprising side, end and top walls, reinforcing members each in the form of substantially an inverted U within the core member and secured to the side and top walls thereof, elongated angle members of considerable weight secured to and extending along the lower marginal portions of the side and end walls of the core member, said angle members having flanges extending outwardly beyond the side and end walls, removable side and end panels for placement upon the outstanding flanges of the angle members in spaced relation with respect to the side and end walls of the core member, means for holding the panels in assembly, and upstanding lugs carried by the outer marginal portions of the flanges of the angle members with which the lower marginal portions of the panels contact from within, the side and end panels being of sheet metal, and reinforcing bars secured to and extending along marginal portions of said panels, said bars being on the outer faces of the panels.

WILLIAM E. WHITED.